United States Patent [19]
Okunishi

[11] Patent Number: 5,873,055
[45] Date of Patent: Feb. 16, 1999

[54] SENTENCE TRANSLATION SYSTEM SHOWING TRANSLATED WORD AND ORIGINAL WORD

[75] Inventor: Toshiyuki Okunishi, Higashiosaka, Japan

[73] Assignee: Sharp Kabushiki Kaisha, Osaka, Japan

[21] Appl. No.: 664,457

[22] Filed: Jun. 14, 1996

[30] Foreign Application Priority Data

Jun. 14, 1995 [JP] Japan .................................... 7-147917

[51] Int. Cl.$^6$ .................................................. G06F 17/28
[52] U.S. Cl. ................................................................ 704/2
[58] Field of Search .............................. 704/1, 2, 3, 4–5, 704/9–10

[56] References Cited

FOREIGN PATENT DOCUMENTS 6243162  9/1994  Japan .
6325081  11/1994  Japan .

*Primary Examiner*—David R. Hudspeth
*Assistant Examiner*—Patrick N. Edouard

[57] ABSTRACT

An assigning machine translation system includes a word dictionary storing grammatical information such as part of speech and translated words for each entry word; dictionary/morphological element analyzer for dividing an input sentence into a set of words, obtaining the grammatical information and the translated word from the word dictionary, and analyzing the tense, person and number; sentence structure analyzer for determining an input sentence structure in accordance with the obtained grammatical information; sentence structure transformer for transforming the determined input sentence structure into a sentence structure for translation, and making a selection from the translated words by examining semantic consistency; translated sentence generator for generating a translated sentence by determining the order of the translated words obtained by the sentence structure transformer and adjusting declension and conjugation; and an original word-translated word match output section for outputting the translated word with the input sentence, the translated word being matched with the original word of the input sentence.

10 Claims, 9 Drawing Sheets

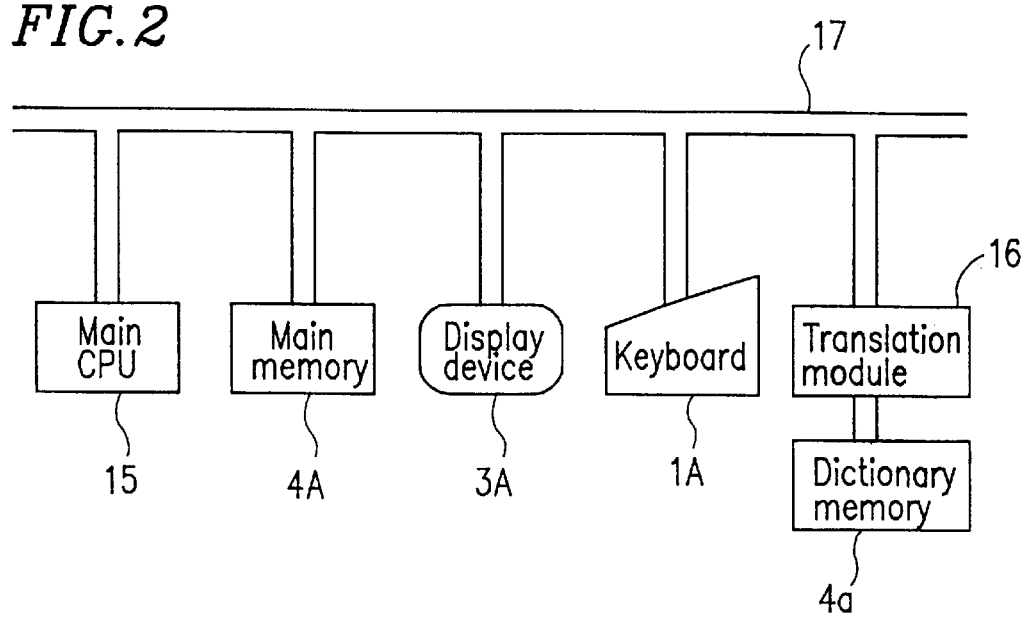
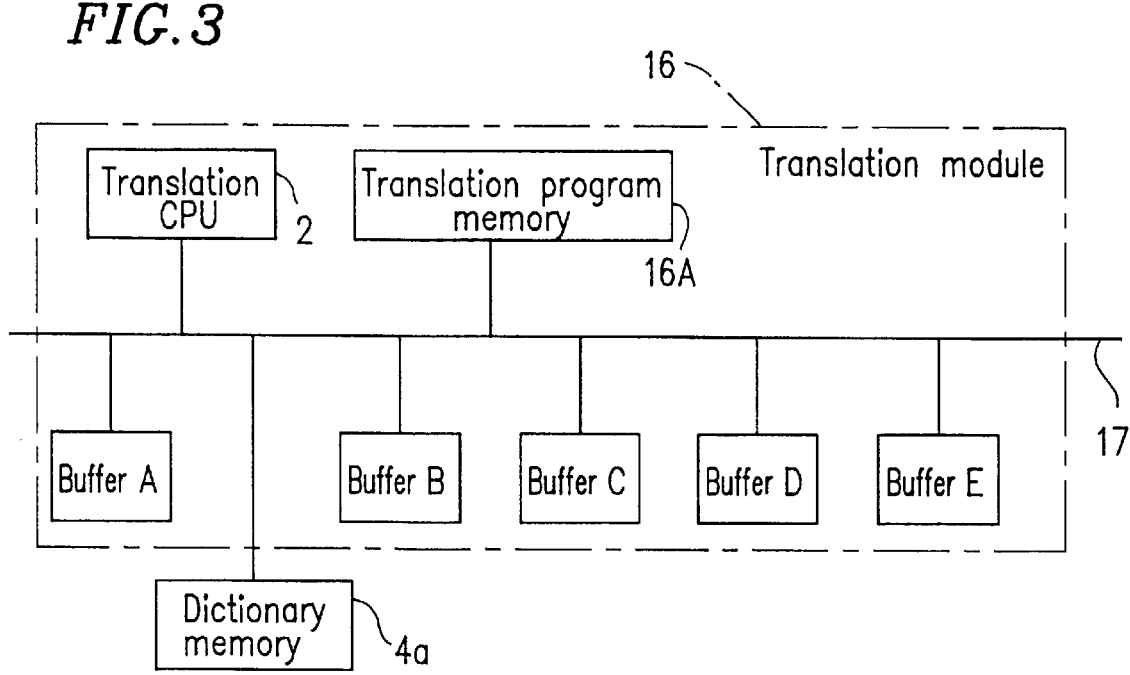

FIG. 5

Example (I will take her child to the zoo.)
Buffer A : Original text buffer

| I | | | | | | | |
|---|---|---|---|---|---|---|---|
| w | i | l | l | | | | |
| t | a | k | e | | | | |
| h | e | r | | | | | |
| c | h | i | l | d | | | |
| t | o | | | | | | |
| t | h | e | | | | | |
| z | o | o | | | | | |
| . | | | | | | | |

FIG. 6

Buffer B : A part of the result of the dictionary search

| | | | |
|---|---|---|---|
| I — | Pronoun | | |
| Will — | Auxiliary verb | Noun | Verb |
| take — | Verb | | |
| her — | Pronoun | Determiner | |
| child — | Noun | | |
| to — | Preposition | Adverb | |
| the — | Determiner | | |
| zoo — | Noun | | |

FIG. 7
Buffer C : The result of sentence structure analysis
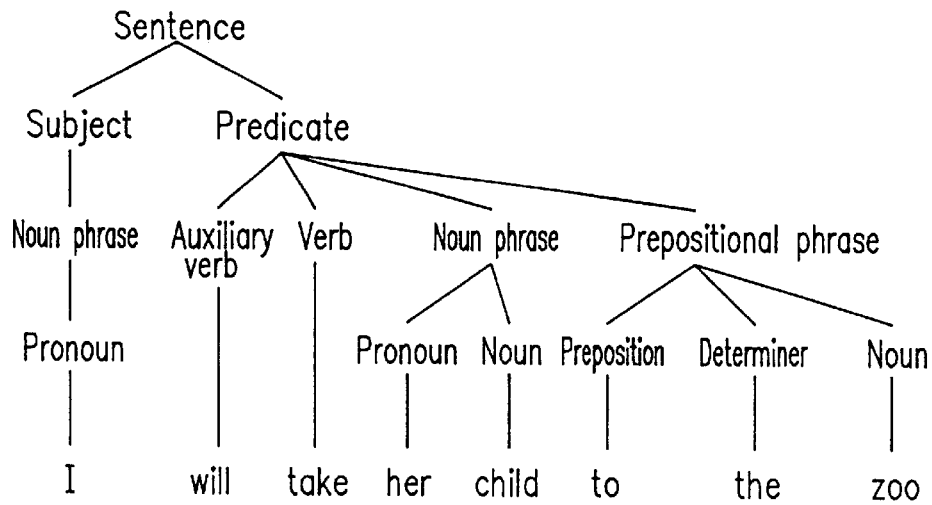
FIG. 8
Buffer D : The result of tree transformation
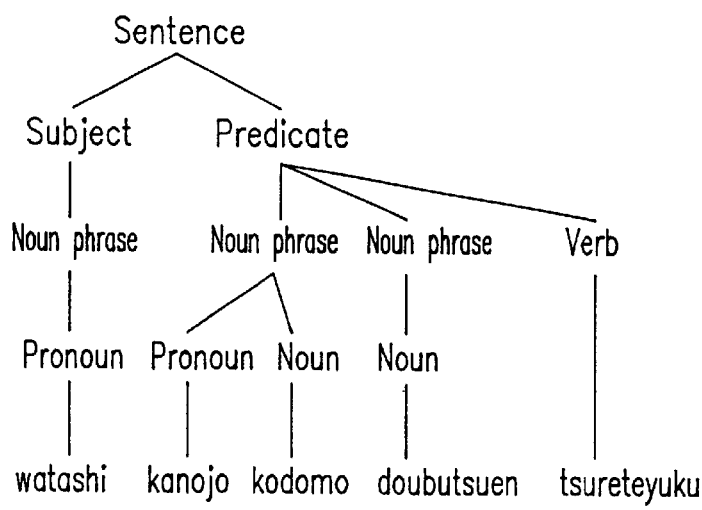
FIG. 9
Buffer E : Output sentence
| Watashi-wa, kanojo-no kodomo-wo doubutsuen-ni tsureteyuku. |
|---|

SENTENCE TRANSLATION SYSTEM SHOWING TRANSLATED WORD AND ORIGINAL WORD

BACKGROUND OF THE INVENTION

1. Field of the Invention

The present invention relates to an assigning machine translation system which disposes a translated word beside the word of the original text.

2. Description of the Related Art

Usually, when a sentence written in one language is translated into another language, it is sometimes difficult to see the corresponding relationship between the original sentence and its translation. This is especially true when the input sentence is long such that it lasts for several lines. Particularly, in the case where the translation is performed between English and Japanese for which sentence structures are quite different, it sometimes happens that a translation of a certain word in the first line of the input sentence is found in the third line of the translated sentence.

As long as a machine translation system operates in such a conventional manner that the editing is performed after the translation is completed, the fact that the corresponding relationship between the words cannot readily be found when comparing the input sentence with the resulting translation poses a burden on a user greater than the burden associated with translation accuracy.

When fast-reading or skimming a text written in a foreign language, or when a user has some knowledge of the language, or when the input sentences have relatively simple structures, it is sometimes convenient to have an output where translation is partially provided only to those words not familiar to the user instead of receiving a fully translated text having the above-mentioned problem so that the rest of the text can be comprehended by the user himself.

Prior art systems designed to answer such demand are "Translation Support System" disclosed in Japanese Laid-Open Patent Publication No. 6-243162 and "Machine Translation System" disclosed in Japanese Laid-Open Patent Publication No. 6-325081.

The translation support system disclosed in Japanese Laid-Open Patent Publication No. 6-243162 outputs the result in a format in which a translated word is disposed besides the original word in the original sentence so that a relationship between the original word and its translation becomes clear. This translation support system includes, as illustrated in FIG. 12, components such as a dictionary memory 23 which holds both dictionary data for transforming Japanese sentences which are input by the keyboard 21 and are held in a text memory 22 into Kanji characters (chinese characters) and translated word data for translating English text, a translation-not-required-word memory 24 for storing English words for which translation is not required when translating the text retrieved from the text memory 22, and registers including a translated word register 25b for holding the translated word retrieved from the text memory 22, etc.

The operation of this translation support system 26 will be described below.

For example, suppose that an English sentence "I will purchase the restaurant from my uncle" is input by the input keyboard 21 and is held in the text memory 22. When a translation command is entered by the keyboard 21, the CPU 27 controls the components so that the text data in the text memory 22 is held in the original word register 25a. The CPU also counts the number of letters in the original word and the result of the counting is held in the number-of-letters-in-original-word register 25c. Then, the CPU makes a search for whether or not the original word data held in the original word register 25a matches any of those held in the translation-not-required-word memory 24, thereby determining whether or not a translation should be given to the original word. For example, if the words "I", "will", "the", "from" and "my" are stored in the translation-not-required-word memory 24, then it is necessary to give translations to the remaining words "purchase", "restaurant" and "uncle". The corresponding translations are searched for in the dictionary memory 23. If the translation is found, the translation is retrieved from the dictionary memory 23 and is held in the translated word register 25b. In this example, as the translated words of "purchase", "restaurant" and "uncle", "kounyuusuru", "restoran" and "oji" are retrieved, respectively.

The number of letters in the translated word is also counted and the result is stored in the number-of-letters-in-translated-word register 25d. Then, display processing is performed in accordance with the numbers of letters in the original word and the translated word, and the result is displayed on the display 29 via the display memory 28. When the result is displayed, the translation is given in a word-to-word manner for easy recognition as follows. In this example, the English sentense to be translated is displayed in an upper line, and the translated words are displayed in a lower line.

| I will | purchase    | the | restaurant from | uncle. |
|--------|-------------|-----|-----------------|--------|
|        | kounyuusuru |     | resutoran       | oji    |

Next, the machine translation system disclosed in Japanese Laid-Open Patent Publication No. 6-325081 will be described with reference to FIG. 13.

The machine translation system disclosed in Japanese Laid-Open Patent Publication No. 6-325081 selects and presents only the information on the object language (language into which a text is translated) such as parts of speech and translation of words, thereby facilitating comprehension of the subject language (language to be translated). As illustrated in FIG. 13, this machine translation system includes input means 31 for inputting a sentence in a first language, morphological element analysis means for performing a morphological element analysis using an analysis dictionary 32, part-of-speech-presuming means 35 for finding the most suited part of speech referring to each word in the sentence in the first language using a part of speech allocation probability table 34 for the first language, output format determining means 36 for generating an output in which the first language and the information on the second language are matched, and output means 37 for outputting the result to the output device.

The operation of the machine translation system 38 will be described below.

For example, suppose an English sentence "I will book the restaurant for my uncle" is input to the system by the input means 31. Then, a morphological element analysis is performed on the sentence, thereby dividing the sentence into morphological elements to be looked up individually in the dictionary. As a result, in a language such as English in which a word can have more than one part of speech, more than one candidate is matched with each morphological element as follows.

I . . . pronoun
will . . . auxiliary verb/noun
book . . . noun/verb
the . . . article
restaurant . . . noun
for . . . preposition/conjunction
my . . . pronoun/exclamation
uncle . . . noun For the above sentence, the words "will", "book", "for" and "my" have more than one candidate for the part of speech and, therefore, ambiguity remains. Then, the part-of-speech-presuming means 35 presumes allocation probabilities of parts of speech, and calculates the probability that the part of speech is correct based on the allocation probability. The part of speech which has the largest probability is then selected. In this prior art example, the trigram model where the presumption of allocation probability is limited up to two words directly in front is used as the part-of-speech-presuming means 35 in order to further take into consideration the in-word relative part of speech appearance probability. For the above input sentence, the following matching for the part of speech is presumed by the part-of-speech-presuming means 35. In particular, the part of speech of the word "book" is presumed to be a verb because of the fact that the part of speech of the word immediately in front is "an auxiliary verb".

I . . . pronoun
will . . . [auxiliary verb]/noun
book . . . noun/[verb]
the . . . article
restaurant . . . noun
for . . . [preposition]/conjunction
my . . . [pronoun]/exclamation
uncle . . . noun Presumed part of speech is indicated by [ ].

Then, information on the second language corresponding to the selected part of speech is obtained from the dictionary. The information on the second language is given and matched at the location of the word of the first language by the output format determining means 36. When this is being done, in order to inhibit frequent outputs of the second language information which is well-known, an output inhibition column for marking is provided in the dictionary. For a word which has more than one usage, if a priority expressed in number is provided for every usage, only an output of a certain usage can be inhibited. For example, the output of the second language information on the word "book" in the above sentence is inhibited when it is a "noun (hon; a book)" and output when it is a "verb (yoyakusuru; to make a reservation)". After the above processing, the output result for the sentence becomes as follows.

| I will book the | restaurant | for my | uncle. |
|---|---|---|---|
| yoyakusuru | resutoran | | oji |

However, the above-mentioned prior art translation support system 26 and the machine translation system 38 have problems described in (a) and (b) below.

(a) Translation accuracy is poor.

In the translation support system 26 disclosed in Japanese Laid-Open Patent Publication No. 6-243162, the same translation (a translation listed first or a translation with the highest priority) is given to the word regardless of other words located before and after the word. For example, since it is most common for the word "book" to be interpreted as a "noun" for part of speech and a "hon (book)" for translation, a wrong translation, that is, a "hon (book)", may be given to the above-mentioned sentence.

| I will | book the restaurant for my uncle. |
|---|---|
| | hon |

On the other hand, since the machine translation system 38 disclosed in Japanese Laid-Open Patent Publication No. 6-325081 takes into consideration the allocation of part of speech for up to two words immediately before as described above, a correct translation to the word "book" in the above input sentence, namely, "a verb; yoyakusuru (to make a reservation)" is given.

However, even if an analysis on a sentence structure is performed in the machine translation system 38 disclosed in Japanese Laid-Open Patent Publication No. 6-325081, only part of the speech is specified. The system cannot ensure a correct translation since it does not make its selection based on semantic considerations and limitations from other translations having the same part of speech. For example, the word "take" has a variety of meaning (translations) such as tenitoru (to hold in a hand), ubau (to take away), tsureteiku (to take along), noru (to embark), taberu (to eat), koudokusuru (to have subscription), yousuru (to take time), ukeru (to receive), toru (to take), etc. Therefore, even if the part of speech is presumed to be a "verb", the correct translation cannot be selected therefrom. In a following input sentence, the most common translation "toru (to take)" to the word "take" is assigned. However, when the object of the verb is "a person", the correct translation is "tsureteiku (to take along)".

| I will | take | her | child | to | the zoo. |
|---|---|---|---|---|---|
| | toru | | kodomo | | doubutsuen |

Accordingly, a user receiving the above two input sentences provided with wrong translations wrongly comprehend the meaning of the two sentences. Of course, it is possible to output more than one candidate for the translation in either Japanese Laid-Open Patent Publications No. 6-243162 or No. 6-325081. However, this places another load on a user to make a selection for the correct translation by himself.

(b) It is not true that translation is given only to necessary words.

To a user, it is sufficient that translation is provided for only those words which are "not familiar" to him. Conversely, it often becomes an obstacle to have a translation provided for a familiar word. The systems in Japanese Laid-Open Patent Publications No. 6-243162 and No. 6-325081 have pre-set "translation-not-required words", "setting of output-inhibition-not-required fields" and "priority for translations" in order to limit words for which a translation should be provided. Although these words for which translations are not required are fixed to the system, the familiarity with words, i.e., whether or not the user knows the word differs greatly among users. In simple, it is quite possible that a word which is unknown to an elementary level student of English (i.e., a word for which a translation must be provided) is already known to an advanced level student. Therefore, if words for which translations are not required are fixed in the system no matter who uses the system such as in the systems disclosed in Japanese Laid-Open Patent Publications No. 6-243162 and No. 6-325081, then translations are not provided for particular words in a meaningful manner.

As described above, when (a) the translation accuracy is poor or (b) there are too many translations for words which do not require translation, a fast reading or skimming cannot efficiently be performed.

SUMMARY OF THE INVENTION

According to one aspect of the present invention, the assigning machine translation system includes a word dictionary storing grammatical information such as part of speech and translated words for each entry word; dictionary/morphological element analyzer for dividing an input sentence into a set of words, obtaining the grammatical information such as part of speech and the translated word for each word in the set of words from the word dictionary, and analyzing the tense, person and number of each word; sentence structure analyzer for determining an input sentence structure such as allocations and connections among words in the set of words in accordance with the grammatical information obtained by the dictionary/morphological element analyzer; sentence structure transformer for transforming the input sentence structure determined by the sentence structure analyzer into a sentence structure for translation, and making a selection for an original word from the translated words by examining semantic consistency; translated sentence generator for generating a translated sentence by determining the order of the translated words obtained by the sentence structure transformer and adjusting declension and conjugation; and original word-translated word match output elements for outputting the translated word with the input sentence, the translated word being matched with the original word of the input sentence, after performing translation processes by the above elements.

According to another aspect of the present invention, the assigning machine translation system includes a word dictionary storing grammatical information such as part of speech and translated words for each entry word, each entry word being given a word level; dictionary/morphological element analyzer for dividing an input sentence into a set of words, obtaining the grammatical information such as part of speech and the translated word for each word in the set of words from the word dictionary, and analyzing the tense, person and number of each word; sentence structure analyzer for determining an input sentence structure such as allocations and connections among words in the set of words in accordance with the grammatical information obtained by the dictionary/morphological element analyzer; sentence structure transformer for transforming the input sentence structure determined by the sentence structure analyzer into a sentence structure for translation, and making a selection for an original word from the translated words by examining semantic consistency; translated sentence generating section for generating the translated sentence by determining the order of the translated words obtained by the sentence structure transformer and adjusting declension and conjugation; translation level setting section for setting by a user a translation level based on level information such as a level of difficulty, a frequency of appearance and a level of importance of words; translated word output determining section for determining whether or not the translated word is given based on the translation level set by the translation level setting section and the word level given to the entry words in the word dictionary; and original word-translated word match output section for outputting the translated word determined to be given by the translated word output determining section with the input sentence, the translated word being matched with the word of the input sentence, after performing translation processes by the above elements.

In one embodiment of the present invention, the word level given to each entry word in the word dictionary is determined based on at least one of first information, second information, third information and fourth information. The first information is about the degree of importance of the word according to an ordinary dictionary and the number of ordinary dictionaries listing the word as important. The second information is about the number of letters constituting the word in the input sentence. The third information is about the kind of part of speech and the fourth information is about the kind of word dictionary such as an elementary dictionary, a user dictionary and a technical dictionary.

In one embodiment of the present invention, the determination of the word level based on the second information is further based on whether or not the number of letters exceeds a certain number, and whether or not a meaning of the word can be inferred from a construction of the word such as a prefix and a suffix.

In one embodiment of the present invention, the determination of the word level based on the third information is such that a low word level is assigned to a certain part of speech and word levels are not assigned to a proper noun and an auxiliary verb.

In one embodiment of the present invention, the translated word output determining section further determines whether or not a translated word is given based on language information obtained during at least one of a sentence structure analysis process, a sentence structure transformation process and a translated sentence generating process.

In one embodiment of the present invention, the language information is about at least one of a structure of a sentence obtained during the sentence structure analysis process, the kind of letters of a translated word obtained during the sentence structure transformation process, whether or not a translated word obtained during the sentence structure transformation process belongs to a field previously set, and a distance between the locations of the same translated words.

In one embodiment of the present invention, the distance between the locations of the same translated words is a distance from the previous location of the translated word.

In one embodiment of the present invention, if the number of the same translated words obtained in the sentence structure transformation process appearing within a prescribed range of a text exceeds a prescribed reference number, a translated word is not given.

According to the present invention, the input sentence is divided into a set of morphological elements (a set of words). Then, each word is looked up in the word dictionary and the tense, person, number, etc. of the word are analyzed. The structure of the input sentence such as allocations and connections among words in the set of morphological elements is determined and transformed into a structure of a translated sentence, and translations for the word are selected while examining the semantic consistency. Furthermore, the order of the appearance of the translated words is determined; the translated sentence is generated by adjusting declension and conjugation; and the translated sentence and the input sentence are arranged into an easy-to-recognize format and output where each word in the input sentence is matched with its translated word. As described, since the translated word is matched with the word in the input sentence after the translation processes such as the morphological element analysis, the sentence structure analysis, the sentence structure transformation and the translated sentence generation, it becomes possible to output the translated words with higher accuracy. Consequently, a user can correctly comprehend the input sentence and perform fast reading and skimming of the input sentence in a foreign language easily and efficiently.

Furthermore, it is determined whether or not a translated word is given in accordance with the translation level set by the translation level setting section based on the level information such as the degree of difficulty, the frequency of appearance and the degree of importance and in accordance with the word level in the word dictionary set based on the level of information such as the degree of difficulty, the frequency of appearance and the degree of importance. Therefore, in accordance with the study level of the user, a word which is not required to be translated is not given a translation. This makes it possible to provide an appropriately translated word of higher accuracy to the minimum number of words desired by the user. The user can perform the fast reading or skimming of the input sentence in a foreign language accordingly.

In this case, the word level in the word dictionary is determined based on at least one of the first information about a degree of importance of the word according to an ordinary dictionary and the number of ordinary dictionaries listing the word as important; the second information about the number of letters constituting the word in the input sentence; the third information about the kind of a part of speech; and the fourth information about the kind of a word dictionary such as an elementary dictionary, a user dictionary and a technical dictionary. With more information described above, a more detailed and accurate translation such that the translation is given only to those to be translated but is not given to those not to be translated can be done.

In the setting of the word level based on the number of letters in the word, if the setting of the word level is further based on whether or not the meaning of the word can be inferred from the structure of the word such as the prefix and suffix, then a more detailed and easy-to-recognize translation can be obtained.

In the setting of the word level based on the kind of the part of speech of the word, if a certain part of speech is associated with low word level and the proper noun and the auxiliary verb are excluded from the word level setting, then the translation becomes easy to recognize, and the fast reading or skimming of the input sentence in a foreign language can be performed easily and efficiently.

It is further possible that the translated word output determining process can determine whether or not the translated word is given based on the language information obtained during at least one of the sentence structure analysis process, the sentence structure transformation process and the translated sentence generating process. A more detailed and accurate translation can be obtained accordingly.

This language information includes at least one of the structure of the sentence obtained during the sentence structure analysis process, the kind of letters of the translated word obtained during the sentence structure transformation process, whether or not the translated word obtained during the sentence structure transformation process belongs to a technical field set by a user, and the distance between the locations of the same translated words. With more information, a more detailed and accurate translation can be realized such that an accurate translation is given only for those words to be translated.

Furthermore, by determining whether or not the translated word is given based on the distance between the locations of the same translated words, or by determining not to give the translated word when the number of the translated words obtained during the sentence structure transformation process exceeds a prescribed reference number, those words which are translated once and remain in the user's memory or those words which are within the vidual range of the user and, therefore, are easy to refer back are not provided with the translation. The translation becomes easy to recognize and the fast reading or skimming of the input sentence in a foreign language can be performed easily and efficiently.

Thus, the invention described herein makes possible the advantage of providing an assigning machine translation system enabling an easy and efficient fast reading or skimming of an input sentence in a foreign language.

This and other advantages of the present invention will become apparent to those skilled in the art upon reading and understanding the following detailed description with reference to the accompanying figures.

BRIEF DESCRIPTION OF THE DRAWINGS

FIG. 2 is a block diagram illustrating a hardware configuration of the assigning machine translation in FIG. 1.

FIG. 3 is a block diagram illustrating a detailed construction of the translation module 16 in FIG. 2.

FIG. 5 is a diagram schematically illustrating a content stored in the buffer A in FIG. 3.

FIG. 6 is a diagram schematically illustrating a content stored in the buffer B in FIG. 3.

FIG. 7 is a diagram schematically illustrating a content stored in the buffer C in FIG. 3.

FIG. 8 is a diagram schematically illustrating a content stored in the buffer D in FIG. 3.

FIG. 9 is a diagram schematically illustrating a content stored in the buffer E in FIG. 3.

DESCRIPTION OF THE PREFERRED EMBODIMENTS

Hereinafter, examples of the present invention will be described.

Figure 1:
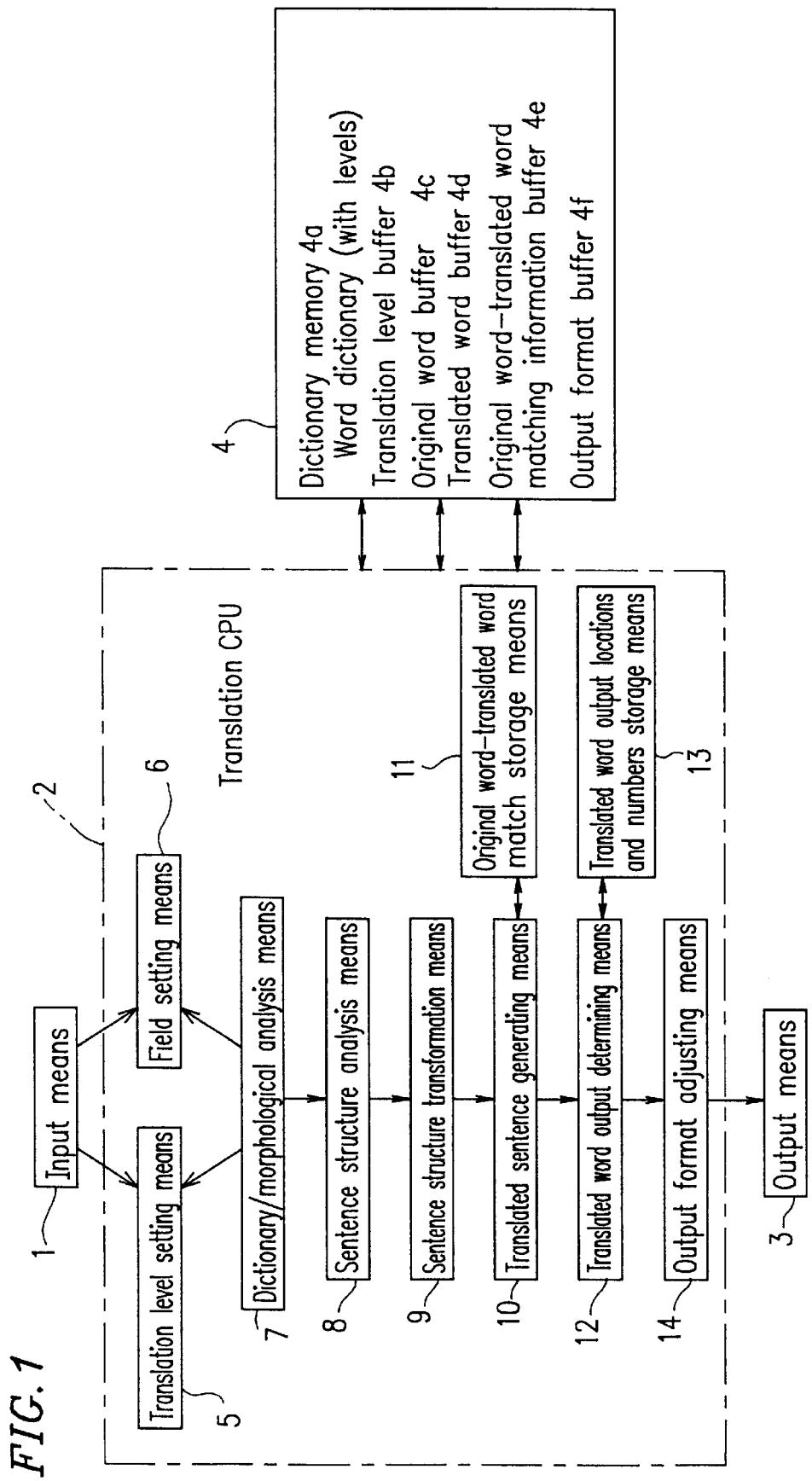
FIG. 1 is a block diagram illustrating a basic structure of an assigning machine translation system according to one example of the present invention.

FIG. 1 is a block diagram illustrating the basic construction of an assigning machine translation system according to one example of the present invention.

In FIG. 1, input means 1 by which a set of letters or a symbol is input is connected to output means 3 via a translation CPU 2. A result of the translation where a translated word corresponding to a word to be translated is provided together with the input sentence is output to output means 3, and the result is displayed or printed by the output means 3. The translation CPU 2 is also connected to a storing means 4 where dictionary data necessary for translation processing by the translation CPU 2 and the processing result are stored.

The construction of this translation CPU 2 is as follows. Translation level setting means 5 to which the above-mentioned input means 1 is connected determines a translation level in accordance with the study level of the user through the input means 1. The field setting means 6 to which the input means 1 is connected determines the technical field of translation through the input means 1. Dictionary/morphological element analysis means 7 to which the translation level setting means 5 and the field setting means 6 are connected looks up in a word dictionary, divides an input sentence into a set of morphological elements (a set of words), obtains grammatical information such as the part of speech of the word and the translated word therefor, and analyzes the tense, the person, the number or the like of the word.

Sentence structure analysis means 8 to which the dictionary/morphological element analysis means 7 is connected determines the sentence structure such as allocations and connections among words in a set of morphological elements of the input sentence in accordance with the grammatical information by using what is called "a structural analysis tree". Sentence structure transformation means 9 to which the sentence structure analysis means 8 is connected transforms the sentence structure analysis tree of the input sentence into the sentence structure analysis tree of the translated sentence and, furthermore, selects the translation for the input word by examining semantic consistency.

Translated sentence generating means 10 to which the sentence structure transformation means 9 is connected determines the order of positioning of the translated words obtained by the sentence structure transformation means 9 and generates the translated sentence by adjusting declension and conjugation. Original word-translated word match storage means 11 to which the translated sentence generating means 10 is connected performs translation processing such as a morphological element analysis, a sentence structure analysis, a sentence structure transformation and a translated sentence generation, and then confirms the match between each word in the input sentence and the translated word and stores the locational relationship. Translated word output determining means 12 to which the translated sentence generating means 10 is connected determines whether or not the translated word is output based on the translation level set by the translation level setting means 5 and the translation level of words in the word dictionary.

Translated word output locations and number storage means 13 to which the translated word output determining means 12 is connected stores the output location and the number of outputs of the translated word. Moreover, output format adjusting means 14 to which the translated word output determining means 12 is connected is connected to the output means 3 and outputs the original sentence and the translated sentence to the output means 3 in an easy-to-recognize format. In the present invention, the output format adjusting means 14 also functions as the original word-translated word match storage means. After performing the translation processing up to the translated sentence generating means 10, it makes a matching between each word in the input sentence and the translated word determined by the translated word output determining means 12 and outputs the translated word with the input sentence.

The construction of the storing means 4 is as follows. The storing means 4 includes a word dictionary 4a which stores grammatical information such as a part of speech for an entry word and a translated word with level information given to each entry word, a translation level buffer 4b for storing the translation level set by a user, an original word buffer 4c for matching the word number of the original sentence and the original word, a translated word buffer 4d for matching the word number of the translated sentence and the translated word, an original word-translated word matching information buffer 4e for storing the information telling at which word from the beginning of the translated sentence the translated word for the original word in the input sentence is located, and an output format buffer 4f for storing the output format for the original sentence and the translated sentence adjusted by the output format adjusting means 14.

Next, the hardware configuration of this machine translation system will be described with reference to FIG. 2.

The assigning machine translation system includes a main CPU 15 which controls other components, a main memory 4A and a dictionary memory 4a as constituent elements of the storage means 4, display means 3A including a CRT (cathode ray tube) or an LCD (liquid crystal display) as the output means 3, a keyboard 1A as the input means 1, a translation module 16 which performs translation, and a bus line 17 for connecting these parts mentioned above.

As illustrated in FIG. 3, the translation module 16 includes the translation CPU 2 which translates a source language input through the bus line 17 in accordance with a prescribed translation program and outputs the result to the bus line 17 as a target language, a translation program memory 16A which stores the translation program to be executed on the translation CPU 2, a buffer A which stores the input original sentence in the source language in units of one word, a buffer B which stores information on each word such as the part of speech, the translated word or the like obtained by referring to the dictionary data stored in the dictionary memory 4a, a buffer C which stores information on the structural analysis tree for the source language, a buffer D which stores the structural analysis tree for the target language transformed from the structural analysis tree for the source language, and a buffer E which stores a sentence adjusted into the form of the target language by supplying appropriate auxiliary words, for example a post-positional particle, an auxiliary verb and the like in a case of Japanese, to the structural analysis tree for the target language.

A machine translation will be described.

Figure 4:
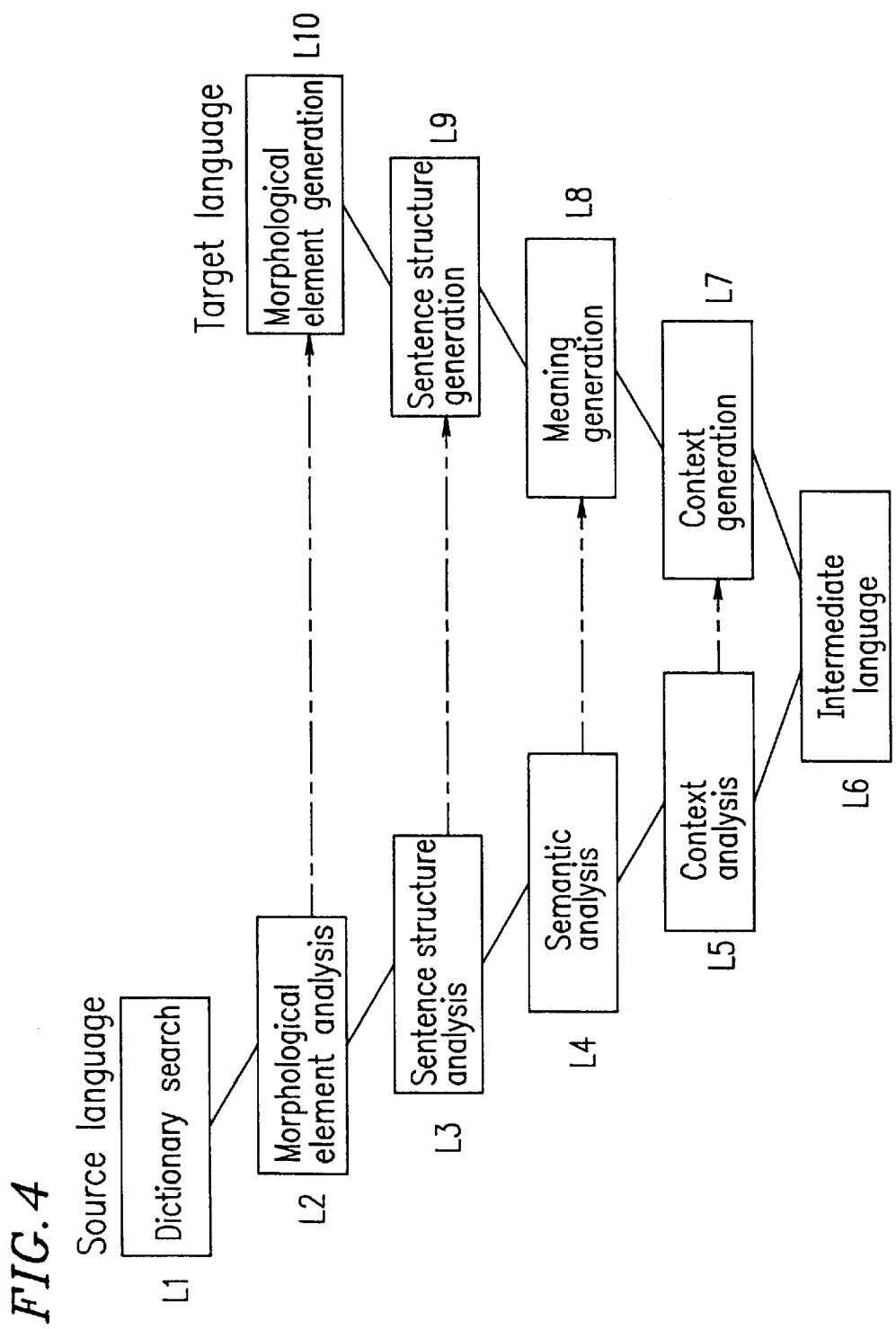
FIG. 4 is a diagram schematically illustrating a concept of machine translation.

As illustrated in FIG. 4, there are various levels of analyses. When a source language is input through the keyboard 1A, the analyses proceed from level L1 for a search in the dictionary to level L2 for a morphological element analysis, level L3 for a sentence structure analysis and so on. The machine translation is divided roughly into two categories depending on to what level of analysis the translation proceeds. One is a pivoting method where the analyses proceed to an intermediate language at level L6 which depends neither on the source language nor on the target language, and then the generation of the target language proceeds from level L6 to level L7 for context generation, level L8 for semantics generation, level L9 for sentence structure generation, and level L10 for morphological element generation. The other is a transfer method where the internal structure of the source language is obtained by performing analyses to one of the above-mentioned levels, namely, morphological element analysis of level L2, the sentence structure analysis of level L3, the semantic analysis of level L4 and the context analysis of level L5. Then, the internal structure of the source language thus obtained is transformed into an internal structure of the target language at the same level, thereby generating the target language.

A translation operation according to the present invention will be described with reference to FIGS. 1 to 9. Here, a case where an English sentence below is translated into Japanese and the translated word having high accuracy is output will be described.

I will take her child to the zoo.

First, the above sentence input from the input means 1 such as the keyboard 1A is stored in the buffer A as illustrated in FIG. 5. In this buffer A, the sentence is divided into individual words (between spaces in case of English), and each word is further divided into individual letters and stored for morphological element processing such as word end processing. In FIG. 5, one row corresponds to one word. The CPU 2 functions in accordance with the translation program stored in the translation program memory 16A so that a translation of each word and grammatical information on the word such as its part of speech relating to the original sentence stored in the buffer A are obtained by referring to the dictionary memory 4a and are stored in the buffer B. For example, the part-of-speech information which is one of the information obtained is stored as illustrated in FIG. 6. Here, although the words "will", "her" and "to" have more than one part of speech, respectively, their parts of speech are uniquely determined in a processing within the translation program by the sentence structure analysis means 8. As described above, in the dictionary search and the morphological element analysis by the dictionary/morphological element analysis means 7, the dictionary in the dictionary memory 4a is used, the input sentence is divided into a set of morphological elements (a set of words), the grammatical information such as the part of speech and the translated word for each word are obtained, and the tense, person, number and the like are analyzed.

In an analytical processing by the sentence structure analysis means 8, a structure analysis tree which illustrates the relationship such as allocations and connections among words is determined in accordance with dictionary data and grammatical rules stored in the dictionary memory 4a as illustrated in FIG. 7. The result is then stored in the buffer C.

The determination of the structure analysis tree is performed as follows. From the grammatical rules stored in the dictionary memory 4a, the following rules are obtained.

sentence→subject, predicate
subject→noun phrase
predicate→auxiliary verb, verb, noun phrase, prepositional phrase
noun phrase→pronoun
noun phrase→noun
prepositional phrase→preposition, determiner, noun For example, the first rule says that a sentence consists of a subject and a predicate. The structure analysis tree is determined in accordance with these rules. As described above, in the sentence structure analysis by the sentence structure analysis means 8, the structure of the sentence (structure analysis tree) such as allocations and connections among words in a set of morphological elements is determined.

In the semantic analysis processing by the sentence structure transformation means 9 in this translation program, the structure of the sentence structure analysis tree for the input English sentence is determined in accordance with the tree structure transformation rules stored in the dictionary memory 4a as illustrated in FIG. 7. Then this sentence structure analysis tree is transformed into the sentence structure analysis tree for the Japanese sentence as illustrated in FIG. 8. The result thus obtained is stored in the buffer D.

When the sentence structure analysis tree is transformed, relationships among main words and phrases of the sentence structure analysis tree shown in FIG. 7 are semantically considered using semantic information in the word dictionary stored in the dictionary memory 4a, thereby an appropriate translation for the original word is selected.

The following semantic information shown in Table 1 below is stored in the word dictionary of the present example.

TABLE 1

Translation and semantic information in the word dictionary

| Entry word | Part of speech | Translation | Semantic information |
|---|---|---|---|
| take | verb | toru | means, a road, money, telephone, a vacation |
|  |  | uketoru | money |
|  |  | toraeru | an animal |
|  |  | nomu | a beverage |
|  |  | tsureteiku | a person, an animal |
|  |  | noru | an automobile an airplone |
| child | noun | kodomo | a person |

As illustrated in Table 1, the part of speech of the word "take" is a verb, and there are several translations for the word such as "toru", "uketoru", "toraeru", etc. The semantic information for a verb includes conditions for translation selection. Specifically, if the object of the verb is one of the nouns listed in the semantic category, then the translation associated to that semantic category is selected.

As shown in Table 1, the part of speech of the word "child" is a noun, and the semantic information of a noun includes a semantic category of the translation. It can be seen from Table 1 that the semantic category of the translation "kodomo" is "hito (a person)".

In the above sentence, the sentence structure analysis result reveals that the object of the word "take" is the word "child". Since the semantic category of the translation of the word "child" is "hito (a person)", a search is performed for a translation of the word "take" whose translation selection condition includes "hito (a person)" to find a translation "tsureteiku". Accordingly, in this example, it is found that translations for the words "take" and "child" are "tsureteiku" and "kodomo", respectively.

As described above, in the semantic analysis by the sentence structure transformation means 9, those which are semantically correct and those which are semantically not correct are determined from the result of a plurality of sentence structure analyses, thereby selecting the appropriate translation for each word.

In a context analysis processing of this translation program by the translated sentence generating means 10, Japanese words "watashi kanojo kodomo doubutsuen tsureteiku" obtained by the sentence structure transformation means 9 are provided with appropriate postpositional particles such as "ha", "no", "ni" and "wo", or auxiliary verbs to shape the sentence so as to conform to Japanese grammar, and the sentence as shown in FIG. 9 is stored in the buffer E. This Japanese sentence "watashi-ha kanojo-no kodomo-wo doubutsuen-ni tsureteiku" is output from the translation module 16 and stored in the main memory 4A. It is possible to display the translated sentence on the display device 3A as the output means 3.

As described above, in the context analysis by the translated sentence generating means 10, the topic of the sentence is considered, and omission or ambiguity is removed.

During the context analysis, the original word-translated word match storage means 11 is activated by the translated sentence generating means 10, and a translated word number telling the location in the translated sentence of the translated word for the original word in the original sentence is stored in the original word-translated word matching information buffer 4e. Then, a set of letters including the original words (a word) matched with its translated word based on data stored in the original word buffer 4c, the translated word buffer 4d and the original word-translated word matching information buffer 4e is stored in the output format buffer 4f, and this is output to the display device 3A as the output means 3 in a suitable form where translated words are provided only to those words necessary to be translated.

Next, the operation of the system in this example where translation is not provided to words which are not required to be translated depending on the study level of the user, but translation is given to the minimum number of words desired to be translated by the user will be described in detail with reference to the block diagram in FIG. 1 and Tables 2, 3 and 4.

First, suppose that the following sentence is input by the input means 1.

The earth contains a large number of metals which are useful to man.

As in the machine translation according to the present invention described above, the dictionary search/morphological element analysis, the sentence structure analysis and the sentence structure transformation are performed on this input sentence, followed by the translated sentence generation process.

When the input sentence is translated, the original word-translated word match storage means 11 is activated by the translated sentence generating means 10, and the translated word number telling the location in the translated sentence of the translated word for the original word in the original sentence is stored in the original word-translated word match information buffer 4e. An example of data stored in the original word-translated word match information buffer 4e is illustrated in Table 2 below. The stored data for the translated word (translated word buffer 4d) and for the original word (original word buffer 4c) corresponding to each number in Table 2 are illustrated in Tables 3 and 4, respectively.

TABLE 2

An example of data stored in the original word-translated word match information buffer 4e

| Original word number | Translated word number |
|---|---|
| 1 | 1 |
| 2 | 2 |
| 3 | 11 |
| 4 | 8 |
| 5 | 8 |
| 6 | 8 |
| 7 | 8 |
| 8 | 9 |
| 9 | * |

TABLE 2-continued

An example of data stored in the original word-translated word match information buffer 4e

| Original word number | Translated word number |
|---|---|
| 10 | * |
| 11 | 7 |
| 12 | 6 |
| 13 | 5 |

TABLE 3

An example of data stored in the original word buffer 4c.

| Original word number | Original word |
|---|---|
| 1 | the |
| 2 | earth |
| 3 | contains |
| 4 | a |
| 5 | large |
| 6 | number |
| 7 | of |
| 8 | metals |
| 9 | which |
| 10 | are |
| 11 | useful |
| 12 | to |
| 13 | man |

TABLE 4

An example of data stored in the translated word buffer 4d.

| Original word number | Translated word |
|---|---|
| 1 | sono/ano/reino |
| 2 | chikyuu |
| 3 | ha |
| 4 | ' |
| 5 | hito |
| 6 | nitotte |
| 7 | yuuekidearu |
| 8 | tasuuno |
| 9 | kinzoku |
| 10 | wo |
| 11 | fukumu |

Then, a set of letters including original words (a word) matched with translated words based on data stored in the original word buffer 4c, the translated word buffer 4d and the original word-translated word match information buffer 4e is stored in the output format buffer 4f, and is output with the input sentence as the output format adjustment result as shown below by the display device 3A as the output means 3.

| The | earth | contains a | large number of metals |
| sono | chikyuu | fukumu | tasuu-no |
| which are | useful to man. | | |
| | yuueki-dearu | | |

A translated word output determining processing for the above-described translation will be described in detail with reference to the flow chart shown in FIG. 10 and Table 5 below.

Entry words contained in the dictionary stored in the dictionary memory 4a are classified into levels based on level information such as level of difficulty, frequency of appearance and degree of importance. In the present example, four levels consisting of "advanced", "intermediate", "elementary" and "pre-elementary" are assumed. The content of the dictionary in which words appearing in the above input sentence are classified into those levels is schematically illustrated in Table 5 below.

TABLE 5

An example of data in the basic dictionary where each entry word is assigned with a level.

| Entry word | Level | Part of speech | Translation |
|---|---|---|---|
| are | pre-elementary | verb | dearu |
| contain | intermediate | verb | fukumu |
| earth | elementary | noun | chikyuu |
| man | elementary | noun | hito/otoko |
| metal | intermediate | noun | kinzoku |
| the | pre-elementary | article | sono |
| to | pre-elementary | preposition | nitotte/he |
| useful | intermediate | adjective | yuuekina/ yakudatsu |
| which | pre-elementary | relative pronoun | |
| a large number of | | adjective | tasuuno |

(In the translation column, "/" is provided to differentiate translated words when the entry word has more than one translation.)

In Table 5, the word "are", for example, is one of the most fundamental words and, therefore, is classified as "pre-elementary". Words classified as "preelementary" are those for which translation is not required. The user sets the translation level in accordance with his study level using the translation level setting means 5. In the present example, three levels consisting of "advanced", "intermediate" and "elementary" are assumed. Level information which is set by the user is stored in the translation level buffer 4b.

First, a case where the translation level of the word is "intermediate" will be described. The initial condition is assumed to be as follows. The same input sentence as before is input, and the translated word for the original word is obtained in a similar manner described above. The original word buffer 4c, the translated word buffer 4d and the original word-translated word match information buffer 4e are all storing the corresponding information.

Figure 10:
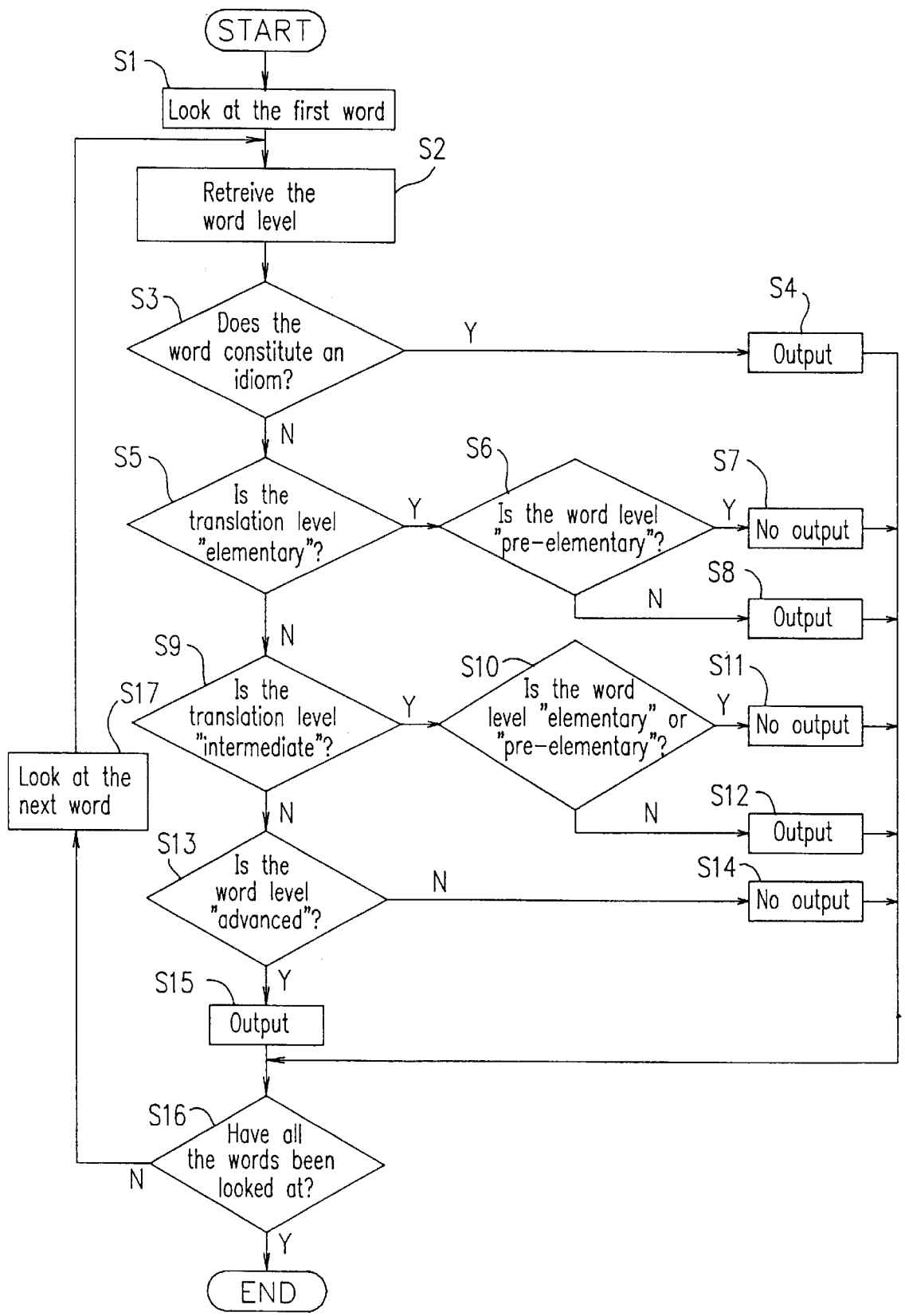
FIG. 10 is a flow chart illustrating one example of an operation of the translated word output determining means 12 in FIG. 1.

As shown in FIG. 10, the translation output determining means 12 first looks at the first word "the" in step S1, and retrieves level information of this word in step S2. It can be seen that the word is at the "preelementary" level from Table 5 schematically illustrating the dictionary with level classification for entry words.

Since the current translation level is set at "intermediate" and the word "the" does not form idioms, the answers to steps S3 and S5 are both NO and the answer to step S9 is YES. In step S10, the level information of the word "the" is confirmed whether it is "pre-elementary" or "elementary". Since the level information of the word "the" is "preelementary", the translation of the word "the" which is below "elementary level" is not output in step S11. In step S16, it is determined whether or not the processing for all the words is finished. If the processing for all the words is not finished yet, then step S17 looks at the next word "earth". Since the level information of the word retrieved in step S2 is "elementary", the translation is not output in step S11, either, as in the case of the first word "the".

Similarly, step S17 looks at the next word "contain". Since the level information of the word retrieved in step S2 is "intermediate" and step S10 following step S9 confirms the level to be "intermediate", the translation of the word "contain" is output in step S12.

The output format for the original sentence and the translated sentence is adjusted by the output format adjusting means 14 and is stored in the output format buffer 4f for the actual output. The stored data is output in the form of a display or printed by the output means 3. The output result by the output means 3 at this point is as follows.

| The earth | contains |
|---|---|
| | fukumu |

Next, step S17 looks at the next word "a" and step S2 retrieves level information. Step S3 determines whether or not a phrase following "a" forms the idiom "a large number of", and if it does, then the translated word is output regardless of the translation level set by the user or level information of the word. An output result of the output means 3 at this point is as follows.

| The earth | contains a | large number of |
|---|---|---|
| | fukumu | tasuu-no |

Similar processes continue and the following output result is obtained at the intermediate level.

| The earth | contains a | large number | of metals | which |
|---|---|---|---|---|
| | fukumu | tasuu-no | kinzoku | |
| are | useful to man. | | | |
| | yuueki-dearu | | | |

Next, differences between the above-described case where the translation level is set at "intermediate" by the user and a case where the translation level is set at "advanced" will be described.

The words "the" and "earth" are not output for the same reason as above. However, the next word "contain" is at "intermediate" level and the translation level is set at "advanced". Therefore, step S14 determines "not to output" the translation for the word. Similarly, the words "metal" and "useful" whose level information is "intermediate" are determined not to be output. As a result, at the advanced level, only the translation of the idiom "a large number of" is output and the output result by the output means 3 becomes as follows.

| The earth contains a | large number | of metals which are |
|---|---|---|
| | tasuu-no | |
| useful to man. | | |

The output adjustment results for the three translation levels set by a user is illustrated below.
(example at elementary level)

| The | earth | contains a | large number of | metals | which are |
|---|---|---|---|---|---|
| | chikyuu | fukumu | tasuu-no | kinzoku | |
| | useful to | | man. | | |
| | yuueki-dearu | | hito | | |

(example at intermediate level)

| The earth | contains a<br>fukumu | large number of<br>tasuu-no | metals<br>kinzoku | which are |
| --- | --- | --- | --- | --- |
| useful to man.<br>yuueki-dearu | | | | |

(example at advanced level)

| The earth contains a | large number<br>tasuu-no | of metals which are |
| --- | --- | --- |
| useful to man. | | |

Examples of criteria for giving level information of a word to be stored in the word dictionary are described in the following examples 1 to 4. Using these criteria of level information, the translated word output determining means 12 determines whether or not the translated word is output.

(EXAMPLE 1)

Level information given to each word in the word dictionary stored in the dictionary memory 4a is set according to how many dictionaries list the word as being important out of a plurality of dictionaries. That is, if many dictionaries list the word as important, then the word is assumed to be a basic word and, thus, familiar to many people for its translation and meaning. Therefore, the word is set to low level.

As described above, the level information to be given to each word in the word dictionary stored in the dictionary memory 4a is set according to the degree of importance indicated in the dictionary or how many dictionaries list the word as being important.

(EXAMPLE 2)

Level information given to each word in the word dictionary stored in the dictionary memory 4a is set according to the letter construction of the word. For example, if the word consists of eleven letters or more, then the word is assumed to be difficult in a sense that it is hard to comprehend or memorize the word. Therefore, the word is set at high level. For example, the following two words consist of more than eleven letters, and the translation is given accordingly.

| supernatural | "choushizenno" |
| --- | --- |
| supervision | "kantoku" |

Even though a word consists of eleven letters or more, if the construction of the word contains a prefix or a suffix so that the word becomes big, and if the meaning of its fragment or of the whole word is readily inferred, the word is set to low level. For example, the above two words both have the prefix "super", and the rest of the words are "natural" and "vision", respectively, which are basic words. The meaning of the former can readily be inferred from the word "natural". However, the meaning of the latter cannot readily be inferred from the word "vision". Therefore, the former is set to low level so that the translation is not given but the latter is set to high level so that the translation is given.

Almost all idioms have more than eleven letters. Therefore, according to this leveling criteria, the idioms are all set to high level (of composite word level). In this case, basic idioms may be set to low level (of composite word level).

As described above, level information given to each word in the word dictionary stored in the dictionary memory 4a is set according to the information on the number of letters constituting each word in the input sentence. The level information is set based on whether or not the number of letters in a word exceeds a certain number and whether or not the meaning of the word can readily be inferred from the construction of the word such as a prefix and a suffix.

(EXAMPLE 3)

Level information given to each word in the word dictionary stored in the dictionary memory 4a is set according to the part of speech of the word. That is, a certain part of speech is given a low word level throughout. For example, since the number of auxiliary verbs is small, translation is not given to this class of words. Similarly, since a proper noun is likely to be translated into katakana or wrongly translated, translation is not given to proper nouns. (Katakana is one of the three Japanese writing systems, namely, hiragaha, katakana and kanji. Foreign words are usually expressed by katakana.)

As described above, the level information given to the word in the word dictionary stored in the dictionary memory 4a is set according to the part of speech of the word. In other words, a certain part of speech is set at low level, and proper nouns and auxiliary verbs are not given translations.

(EXAMPLE 4)

Level information given to each word in the word dictionary stored in the dictionary memory 4a is set according to what kind of dictionary lists the word. That is, those listed in a dictionary for use by an elementary level student are assumed to be basic and set at low level accordingly. On the other hand, words listed in a user dictionary and a technical dictionary are assumed to be technical or to have special translation and set at high level accordingly.

As described above, level information given to each word in the word dictionary stored in the dictionary memory 4a is set based on information on the kinds of dictionaries from which the word is taken such as the elementary dictionary, the user dictionary and the technical dictionary.

Next, instead of the fixed level information given to each word in the word dictionary stored in the dictionary memory 4a, examples 5 to 7 for criteria where the translated word output determining means 12 determines whether or not translation is given based on the language information obtained during the above-mentioned translation processes (the sentence structure analysis processing, the sentence structure transformation processing and the translated sentence generating processing) will be described below.

(EXAMPLE 5)

Using the sentence structure of the original sentence obtained as a result of the sentence structure analysis, the translated word output determining means 12 determines whether or not the translated word is given. That is, when the sentence structure analysis is done, a structure constituting the sentence such as the noun phrase corresponding to the subject or the main verb in the predicate is obtained. Using this sentence structure analysis information, even though they are at low level, translation is given to the word and phrase having an important meaning in the sentence. Particularly, at the elementary level, translation is given to words functioning as a subject or a predicate regardless of their levels. Conversely, in the advanced level, translation is not given to words functioning as a modifier (including words within a relative clause).

The present example will specifically be described referring to an input sentence illustrated as an example below. In the "elementary" level, in addition to determining by the levels of words, translation is given to those functioning as constituent elements of the sentence such as S (subject), V (verb), O (object), etc. In the "intermediate" level where only the word level is considered, translation is not given simply because the word functions as the constituent element. For example, the word "friends" which is the constituent element (subject) of the sentence is translated at the "elementary" level but is not translated at the "intermediate" level". Furthermore, in the "advanced" level, the word "derived" which would be translated if only the word level were considered is not translated because the word appears in the relative clause as a modifier phrase.

(elementary level: word level and constituent element of the sentence are considered)

| Her | friends tomodachi | extolled zessannshita | Japan where | technology gijutsu | are |
|---|---|---|---|---|---|
| | derived haseisuru | from the | theory. riron | | |

(intermediate level: only word level is considered)

| Her friends | extolled zessanshita | Japan where | technology are gijutsu |
|---|---|---|---|
| derived haseisuru | from the | theory. riron | |

(advanced level: modifiers such as relative clause are not translated)

| Her friends | extolled zessanshita | Japan where technology are |
|---|---|---|
| | derived from the theory. | |

As described above, the translated word output determining means 12 determines whether or not translation is given to the word based on not only the word level but also the structure of the sentence obtained during the sentence structure analysis process.

(EXAMPLE 6)

The most appropriate translation is determined by translated word selection using semantic processing performed during the sentence structure transformation. An output determination is performed by determining the kind of letter of the translated word. For example, a translated word which is obtained by representing the pronunciation of the English word in katakana does not have useful information for comprehending the English sentence. Therefore, translation is not given regardless of the level of the word.

Example 6 will specifically be described with reference to an input sentence illustrated as an example below.

(before inhibiting katakana translation)

| The text tekisuto | describes kijutsusuru | a mechanism and mekanizumu | programming puroguramingu |
|---|---|---|---|
| model moderu | for new | software. sofutouea | |

(after inhibiting katakana translation)

| The | text describes | a mechanism and programming |
|---|---|---|
| | | kijutsusuru |
| model for new software. | | |

In the above translation, all translated words except the word "kijutsusuru" are translations in katakana.

It can be seen that, after inhibiting katakana translation, the translation result is easy to read.

As described above, the translated word output determining means 12 determines whether or not translation is given based on not only the word level but also the kind of letters used to express the translated word obtained during the sentence structure transformation processing.

(EXAMPLE 7)

It is sometimes not necessary to give translation to a certain word depending on the field. As a machine translation system at the practical level, a user set the field of the document to be translated by the field setting means 6 through the input means 1. Although this is for appropriately performing the translated word selection, this field information is used for determination by the translated word output determining means 12 of whether or not translation is given. That is, when a translated word of the field set by the user (special translation) is selected, the translated word output means 12 determines that the translation is given even if the word is at low level.

For example, for the first output determination on the sentence below, since the word level of the word "attack" is low, translation is not given. However, for the second output determination where the field "medicine" is set, the translated word "hatsubyou" is output.

| She had an | attack hatsubyou | of fever. |
|---|---|---|

As described above, the translated word output determining means 12 determines whether or not translation is given based on information as to whether or not the translated word obtained during the sentence structure transformation processing is one of those in the field set by the user.

(EXAMPLE 8)

In Example 8, criteria for the translated word output determining means 12 to determine whether or not translation is given based on the information from the translated word output locations and numbers storage means 13 will be described.

Every time a translated word is given, the translated word and its display location are stored in the translated word output locations and number storage means 13. Based on the information from the translated word output locations and number storage means 13, the translated word is given only when there is a distance greater than the distance from the previous display location of the translated word.

Or, when the number of displays of a translated word exceeds a certain reference number within a certain range of the document, the translated word is not displayed. Or, it is possible to determine whether or not the translated word is displayed based on the distance from the location of the previous display for all the words (translated words).

In the first result of the translation of the following text (before applying the present rule), the words appearing more than once such as "critical temperature (rinkai-ondo)", "carbon (tanso)", "heat (kanetsu-suru)", "temperature (ondo)", etc. are provided with their translated words for every appearance. However, in the second result of the translation (after applying the present rule), the translated words appearing for the second time and more are prevented from being displayed, thereby improving the recognizability. (Before applying the present rule)

```
In the first place,   steel which    contains very
mazu-daiichi-ni                      fukumu
little    carbon   will be   milder         than steel.  Secondly,
          tanso             odayaka-na                   daini-ni
we  can heat    the    carbon   above a certain
    kanetsu-suru       tanso
critical temperature. At this    critical temperature,
rinkai-ondo                      rinkai-ondo
changes begin to take place in the   molecular structure.
                                     bunshi-no kouzou
In the process known as   annealing,       we heat the
                          yakinamishi      kanetsu-suru
carbon   above the   critical temperature.   We heat it
tanso                rinkai-ondo             kanetsu-suru
up beyond the   critical temperature,   and    then quench
                rinkai-ondo                    yokusei-suru
it in other   liquid.    The     temperature   drop fixes the
              ekitai             ondo
change in the   carbon    which    occurred at the
                tanso              hassei-suru
critical temperature.  But a bar of   this hardened
rinkai-ondo                           katakunatta
carbon    is more    liable to       fracture      than normal
tanso                keikou-ga-aru   hasai         seijou-na
carbon.  We therefore  heat it           again to a temperature
tanso                  kanetsu-suru
below the   critical temperature.
            rinkai-ondo
(After applying the present rule)

In the first place,   steel which    contains very
mazu-daiichi-ni                      fukumu
little    carbon   will be    milder        than steel.  Secondly,
          tanso              odayaka-na                  daini-ni
we  can heat       the carbon above a certain
    kanetsu-suru
critical temperature. At this critical temperature,
rinkai-ondo
changes begin to take place in the   molecular structure.
                                     bunshi-no kouzou
In the process known as   annealing,      we heat the
                          yakinamishi
carbon above the critical temperature. We heat it
up beyond the critical temperature, and   then quench
                                          yokusei-suru
it in other  liquid.   The    temperature drop fixes the
             ekitai           ondo
change in the carbon which  occurred at the
                            hassei-suru
critical temperature. But a bar of this   hardened
                                          katakunatta
carbon is more   liable to       fracture     than normal
                 keikou-ga-aru   hasai        seijou-na
carbon. We therefore heat it again to a temperature
below the critical temperature.
```

The operation of the translated word output determining means 12 in the above-described examples 1 to 8 will be described with reference to the flow chart shown in FIG. 11.

Figure 11:
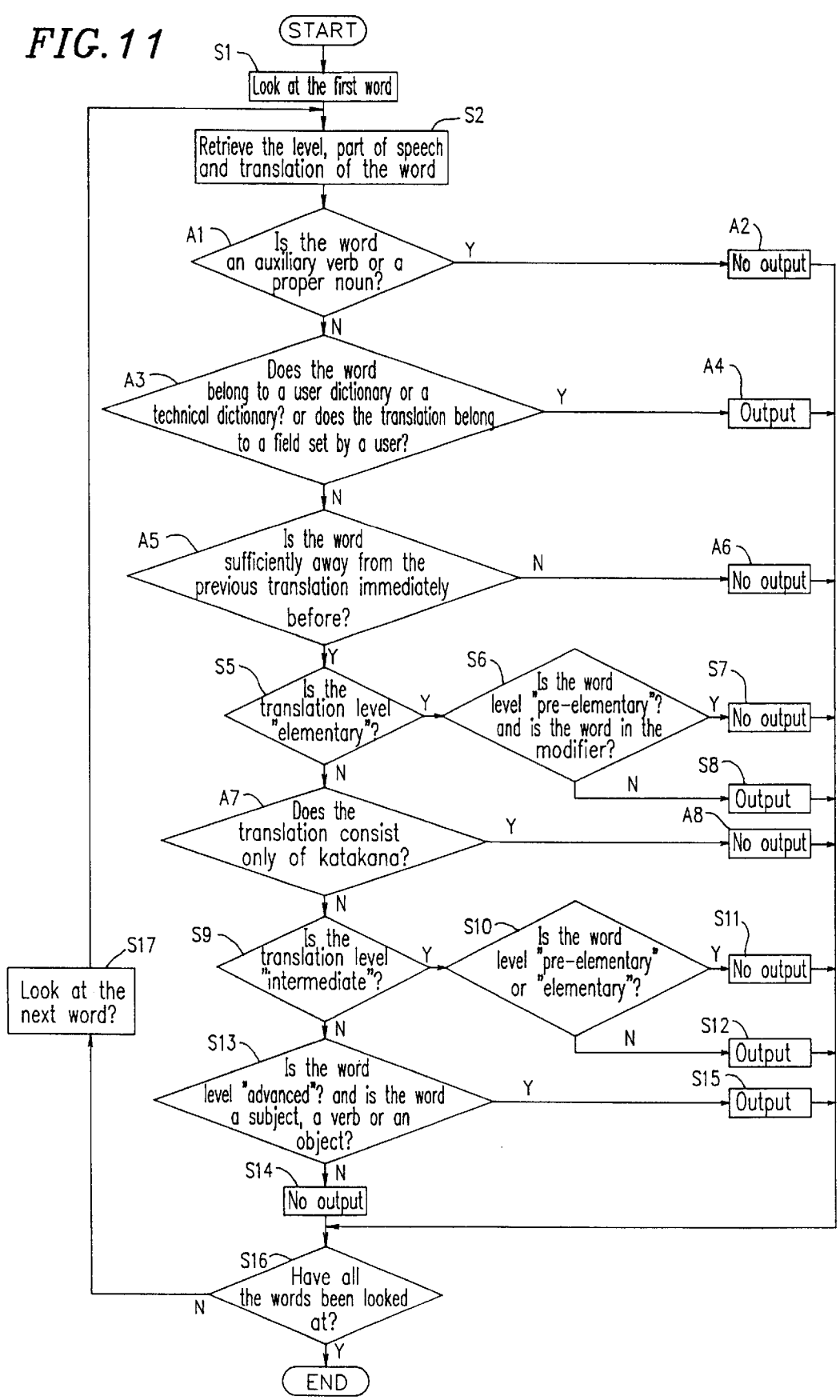
FIG. 11 is a flow chart illustrating another example of an operation of the translated word output determining means 12 in FIG. 1.
Figure 12:
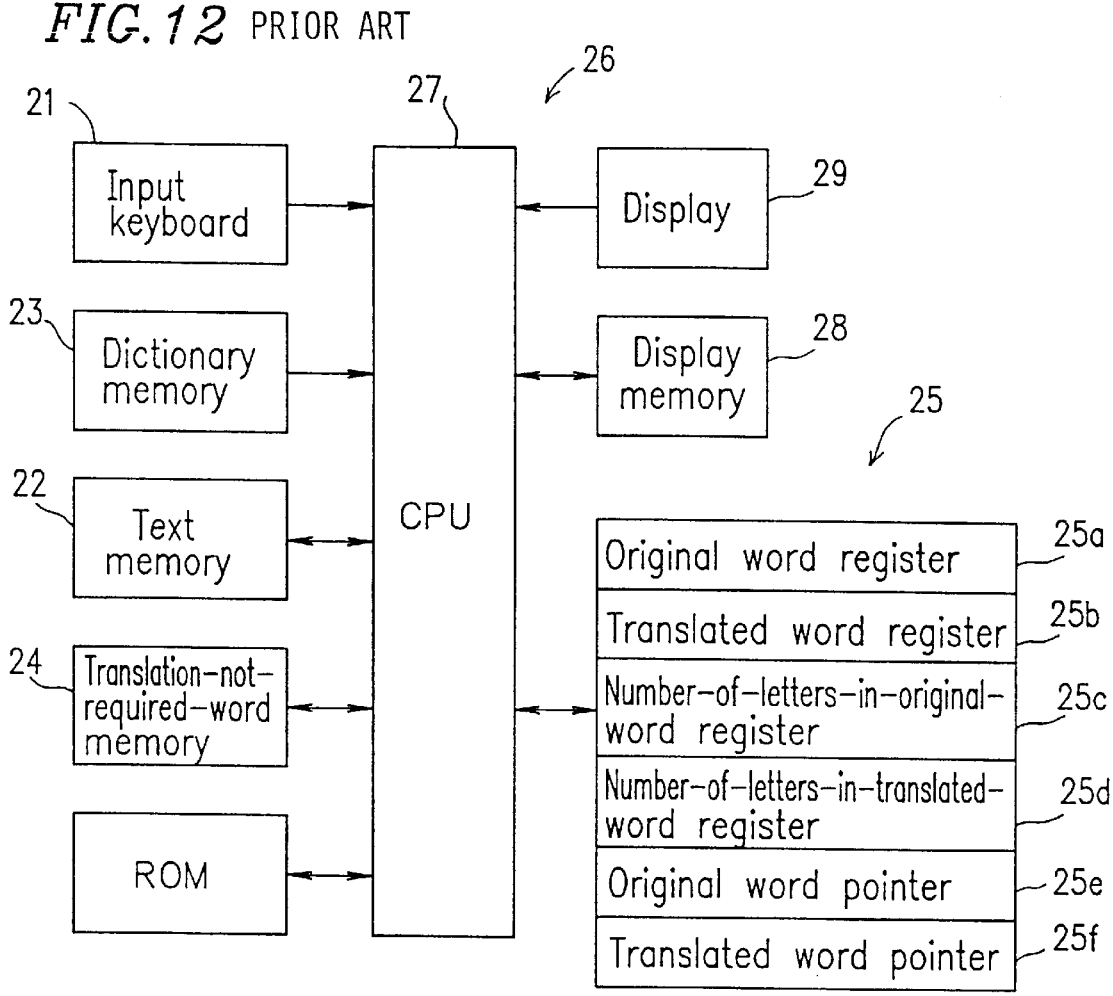
FIG. 12 is a block diagram illustrating a construction of a prior art translation support system.
Figure 13:
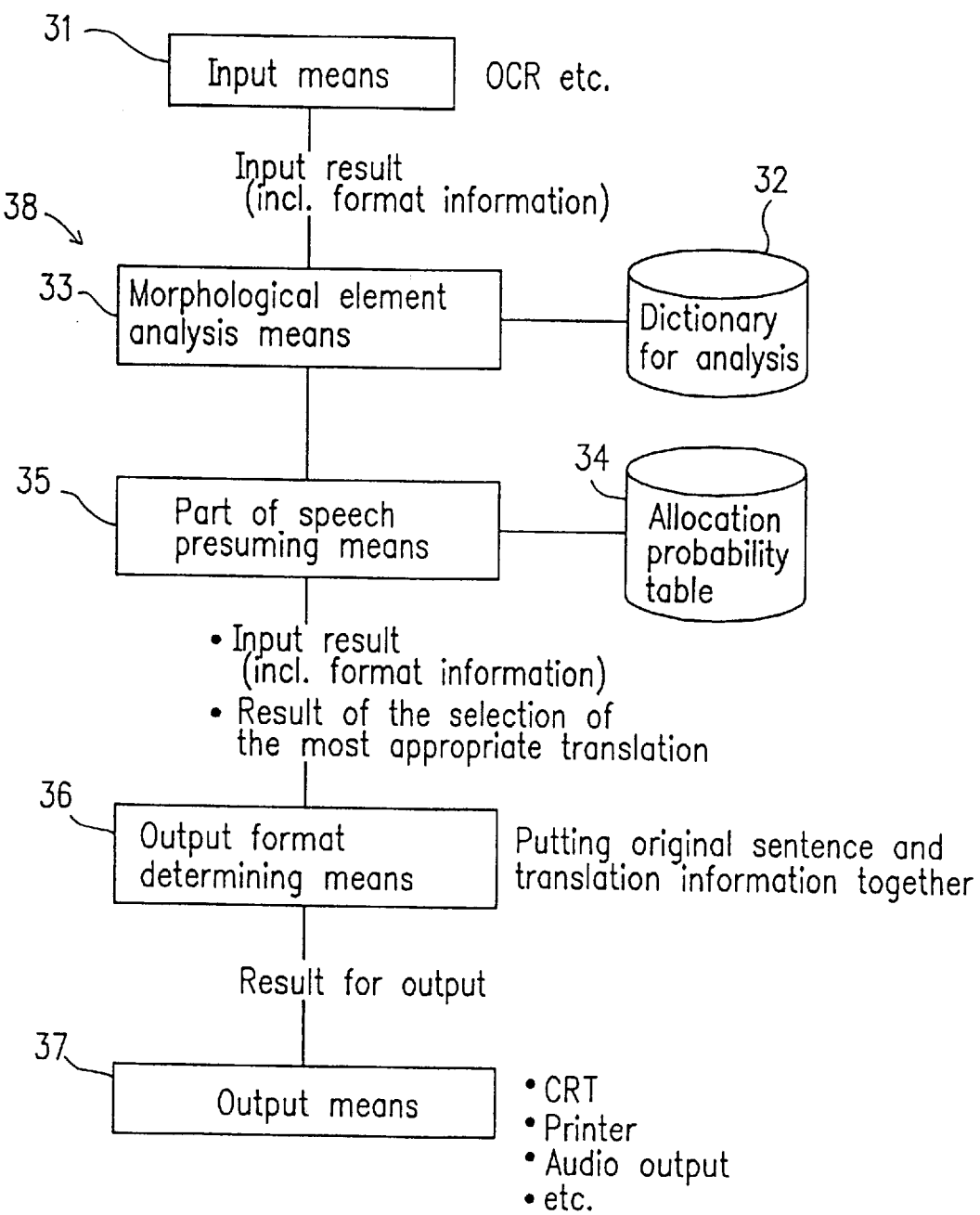
FIG. 13 is a block diagram illustrating a construction of a prior art machine translation system.

As illustrated in FIG. 11, the first word is looked at in step S1. Next, the level information, the part of speech and the translation of the word are retrieved in step S2. Then, the part of speech of the word is determined based on whether it is an auxiliary verb or a proper noun in step A1. If YES, that is, if the part of speech of the word is either an auxiliary verb or a proper noun, then the translated word is not output in step A2. Then, step S16 determines whether or not all the words are looked at. If all the words are not looked at yet, the next word is looked at in step S17, and the program proceeds to step A1 through step S2.

If the word looked at in step S1 is neither an auxiliary verb nor a proper noun, then step A3 determines whether or not the word is contained in a user dictionary or a technical dictionary or its translated word belongs to a designated field. If YES, its translated word is output in step A4. Then, step S16 determines whether or not all the words are looked at. If all the words are not looked at yet, the next word is looked at in step S17, and the program proceeds to step A1 through step S2.

If NO both in step A1 and step A3, then the program proceeds to step A5 where it is determined whether or not the translated word is sufficiently far away from the location of the previous display. If it is not sufficiently far away from the location of the previous display of the same word, then the translated word is not output in step A6. Then, step S16 determines whether or not all the words are looked at. If all the words are not looked at yet, the next word is looked at in step S17, and the program proceeds to step A1 through step S2.

If NO both in step A1 and step A3 and if YES in step A5, the program proceeds to step S5 where it is determined whether or not the translation level is "elementary". If the translation level is "elementary", then it is determined whether or not the level information of the word is "pre-elementary" and a modifier in the sentence. If the level information of the word is "pre-elementary" and the word is a modifier in the sentence, then the translated word is not output in step S7. If the level information of the word is "pre-elementary" and the word is not a modifier in the sentence, then the translated word is output in step S8. Then, step S16 determines whether or not all the words are looked at. If all the words are not looked at yet, the next word is looked at in step S17, and the program proceeds to step A1 through step S2.

When the program proceeds from step A1 to step A7, it is determined whether or not the translated word consists only of katakana in step A7. If the translated word consists only of katakana, then the translated word is not output in step A8. Then, step S16 determines whether or not all the words are looked at. If all the words are not looked at yet, the next word is looked at in step S17, and the program proceeds to step A1 through step S2.

When the program proceeds from step A1 to step A7 and if NO in step A7 and the program proceeds to step S9 accordingly, then it is determined whether or not the translation level is "intermediate" in step S9. If the translation level is "intermediate", then it is determined whether or not the level information of the word is either "pre-elementary" or "elementary". If the level information of the word is either "pre-elementary" or "elementary", then the translated word is not output in step S11. If the level information of the word is neither "pre-elementary" nor "elementary", then the translated word is output in step S12. Then, step S16 determines whether or not all the words are looked at. If all the words are not looked at yet, the next word is looked at in step S17, and the program proceeds to step A1 through step S2.

When the program proceeds from step A1 to step S9 and if NO in step S9 and the program proceeds to step S13, then it is determined whether or not the level information of the word is "advanced" and the word is the subject, the verb or the object in the sentence. If the level information of the word is "advanced" and the word is the subject, the verb or the object in the sentence, then the translated word is output in step S15. Then, step S16 determines whether or not all the words are looked at. If all the words are not looked at yet, the next word is looked at in step S17, and the program proceeds to step A1 through step S2.

When the program proceeds from step A1 to step S13 where it is determined that the level information of the word is "advanced" and the word is not the subject, the verb or the object, then the translated word is not output in step S14. Then, the program proceeds to step S16 where it is determined whether or not all the words are looked at. If all the words are looked at, the program ends.

As described above, the determination of whether or not the translated word is output is made in great detail, and the translation of words which do not require translation is precisely prevented from being output depending on the study level of the user. Therefore, fast reading or skimming of the input text can be performed more efficiently.

As described above, according to the present invention, the sentence input by the input means 1 is divided into morphological elements. Each word is looked up in the word dictionary and the tense, the person or the number of the word is analyzed. The sentence structure analysis means 8 determines the structure of the input sentence such as allocations and connections among morphological elements. The sentence structure transformation means 9 then transforms the sentence structure into another sentence structure for a translated sentence and selects the translated words while examining semantic consistency. Then the translated sentence generating means 10 determines the arrangement for these translated words and generates the translated sentence while adjusting the declension and conjugation. After performing the translation processes such as the morphological element analysis, the sentence structure analysis, the sentence structure transformation and the translated sentence generation, the output format adjusting means 14 assigns translation in accordance of the matching between each word in the input sentence and its translated word. When assigning translation, the translated word output determining means 12 determines whether or not the translation is given in accordance with the translation level set by the translation level setting means 5 and the translation level in the word dictionary. Therefore, the fast reading or skimming of the input text in a foreign language can be performed efficiently.

As described above, according to the present invention, since translation is assigned while matching each word of the input sentence with its translated word after performing the translation processes such as the morphological element analysis, the sentence structure analysis, the sentence structure transformation and the translated sentence generation, a more accurately translated word can be output. The user can comprehend the input text correctly, and fast reading and skimming of the input text in a foreign language can be performed easily and efficiently.

Moreover, level information is given to every entry word, and the user determines the translation level. The system then determines whether or not the translation is given in accordance with the translation level set by the user and the level information of the word. Therefore, depending on the user, translation is not given for words which do not require translation. Thus translation is provided in accordance with the study level of the user, thereby affording for fast reading or skimming of the input text in an efficient manner.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An assigning machine translation system, comprising:

a word dictionary storing grammatical information and translated words for each entry word, said each entry word being given a word level;

dictionary/morphological element analysis means for dividing an input sentence into a set of words, obtaining the grammatical information and the translated word for each word in said set of words from said word dictionary, and analyzing the tense, person and number of said each word;

sentence structure analysis means for determining an input sentence structure in said set of words in accordance with the grammatical information obtained by said dictionary/morphological element analysis means;

sentence structure transformation means for transforming the input sentence structure determined by said sentence structure analysis means into a sentence structure for translation, and making a selection for an original word from said translated words by examining semantic consistency;

translated sentence generating means for generating the translated sentence by determining the order of the translated words obtained by said sentence structure transformation means and adjusting declension and conjugation;

translation level setting means for setting by a user a translation level based on level information including at least one of a level of difficulty, a frequency of appearance and a level of importance of words;

translated word output determining means for determining whether or not the translated word is given based on the translation level set by said translation level setting means and the word level given to the entry words in said word dictionary; and original word-translated word match output means for outputting the translated word determined to be given by said translated word output determining means with said input sentence, said translated word being matched with the word of said input sentence, after performing translation processes by the above means.

2. An assigning machine translation system according to claim 1, wherein said word level given to each entry word in said word dictionary is determined based on at least one of first information, second information, third information and fourth information:

said first information being about a degree of importance of the word according to an ordinary dictionary and the number of ordinary dictionaries listing the word as important;

said second information being about the number of letters constituting the word in said input sentence;

said third information being about the kind of a part of speech; and said fourth information being about the kind of word dictionary.

3. An assigning machine translation system according to claim 2, wherein said determination of the word level based on said second information is further based on whether or not said number of letters exceeds a certain number, and whether or not the meaning of the word can be inferred from a construction of said word including a prefix or a suffix.

4. An assigning machine translation system according to claim 2, wherein said determination of the word level based on said third information is such that a low word level is assigned to a certain part of speech and word levels are not assigned to a proper noun and an auxiliary verb.

5. An assigning machine translation system according to claim 1, wherein said translated word output determining means further determines whether or not a translated word is given based on language information obtained during at least one of a sentence structure analysis process, a sentence structure transformation process and a translated sentence generating process.

6. An assigning machine translation system according to claim 5, wherein said language information is about at least one of a structure of a sentence obtained during said sentence structure analysis process, the kind of letters of a translated word obtained during said sentence structure transformation process, whether or not a translated word obtained during said sentence structure transformation process belongs to a field previously set, and a distance between the locations of the same translated words.

7. An assigning machine translation system according to claim 6, wherein said distance between the locations of the same translated words is a distance from the previous location of the translated word.

8. An assigning machine translation system according to claim 5, wherein, if the number of the same translated words obtained in said sentence structure transformation process appearing within a prescribed range of a text exceeds a prescribed reference number, a translated word is not given.

9. An assigning machine translation system according to claim 1, wherein the grammatical information includes a part of speech, and the input sentence structure includes allocations and connections among words.

10. An assigning machine translation system according to claim 1, wherein said original word-translated word match output means outputs the translated word and the original word in a format that allows a person to visually compare the original word and the translated word.

* * * * *